(12) United States Patent
Barry

(10) Patent No.: US 6,851,688 B2
(45) Date of Patent: Feb. 8, 2005

(54) STEERING LINKAGE BALL JOINT ASSEMBLY

(75) Inventor: Jackson E. Barry, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 10/064,734

(22) Filed: Aug. 12, 2002

(65) Prior Publication Data

US 2004/0026884 A1 Feb. 12, 2004

(51) Int. Cl.$^7$ ................................................ B62D 7/18
(52) U.S. Cl. ............................. 280/93.51; 280/93.511; 280/93.512; 403/122; 403/143
(58) Field of Search ..................... 280/93.51, 93.511, 280/93.502, 93.512, FOR 124, FOR 125; 403/122, 143

(56) References Cited

U.S. PATENT DOCUMENTS

| | | | |
|---|---|---|---|
| 2,049,502 A | | 8/1936 | Hufferd et al. |
| 2,510,406 A | * | 6/1950 | Lucas .......................... 403/143 |
| 4,327,926 A | | 5/1982 | Suganuma |
| 4,819,959 A | | 4/1989 | Inoue et al. |
| 4,842,296 A | | 6/1989 | Kubo |
| 5,026,091 A | | 6/1991 | Lee |
| 5,348,334 A | | 9/1994 | Giltinan |
| 6,276,702 B1 | | 8/2001 | Turck et al. |
| 6,719,312 B2 | * | 4/2004 | Thompson et al. ..... 280/93.511 |
| 6,733,019 B2 | * | 5/2004 | Diener et al. ............ 280/93.51 |
| 2003/0137120 A1 | * | 7/2003 | Thompson et al. ..... 280/93.511 |
| 2003/0214110 A1 | * | 11/2003 | Diener et al. ............ 280/93.51 |

* cited by examiner

*Primary Examiner*—Eric Culbreth
(74) *Attorney, Agent, or Firm*—Gary Smith; Ford Global Technologies, LLC

(57) ABSTRACT

A steering linkage assembly for a motor vehicle has a tie rod and a drag link connected to a steering knuckle in an over/under arrangement, with first and second ball joints for the drag link and the tie rod respectively on opposite sides of the steering knuckle and having a common axis that is located within an interior volume of a wheel supported by the steering knuckle. The coaxial, over/under configuration results in a ball joint assembly having a minimum axial dimension so that both ball joints can be located inside the inner rim of the wheel and as far outboard and as far forward as possible. The extreme outboard placement of the drag link ball joint maximizes the length of the drag link to reduce bump and roll steer sensitivity, and the forward placement maximizes the effective steering arm radius to reduce steering linkage loads while also improving packaging.

11 Claims, 3 Drawing Sheets

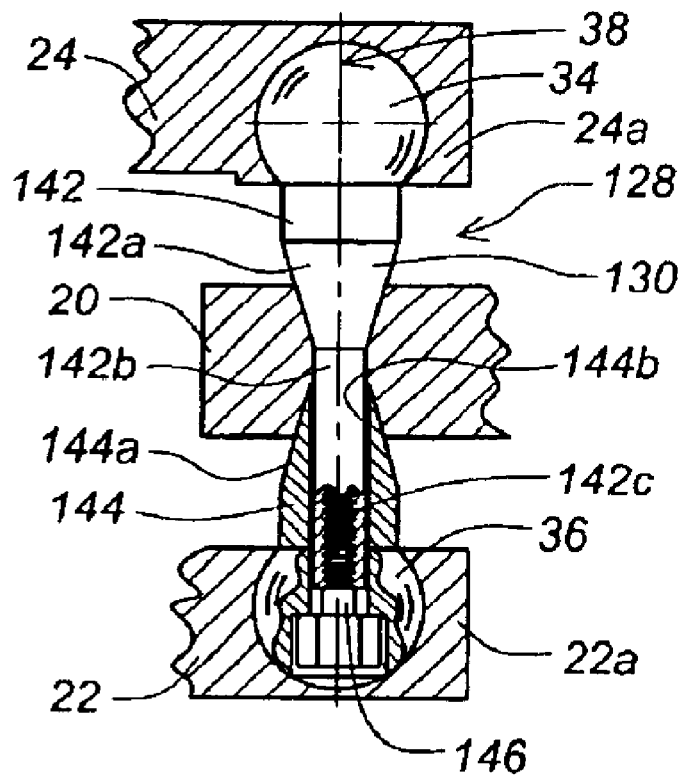
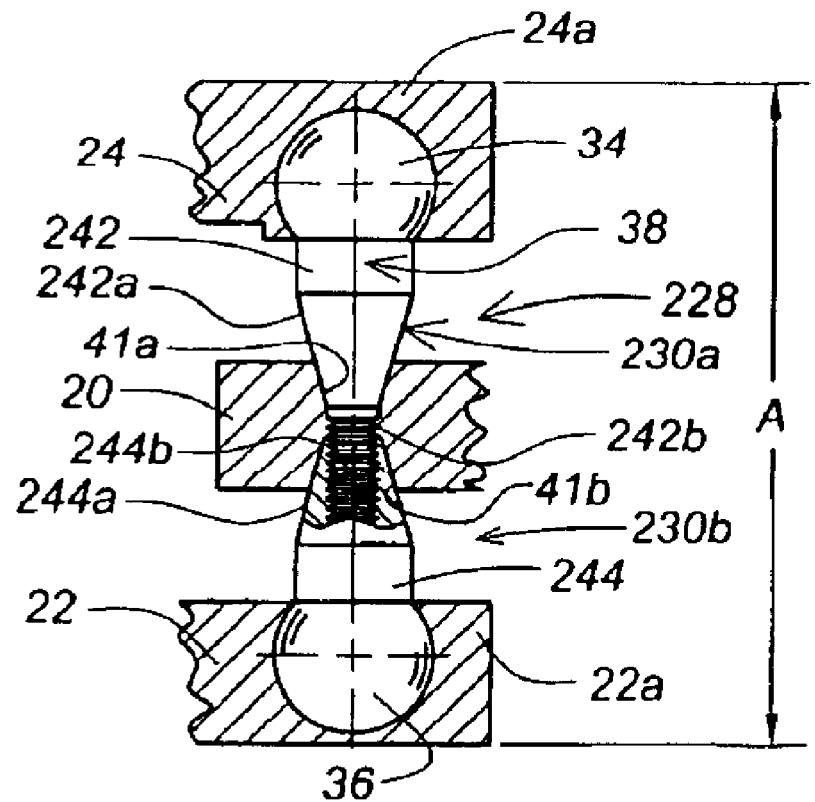

STEERING LINKAGE BALL JOINT ASSEMBLY

BACKGROUND OF INVENTION

1. Field of the Invention

The present invention relates generally to steering linkages for automotive vehicles (including agricultural, off-highway, and recreational vehicles), and more particularly to a ball joint assembly with an over/under configuration.

2. Background

A typical automotive vehicle steering linkage includes two steering knuckles, one on each of the steered wheels, interconnected by a tie rod extending across the vehicle to force the two wheels to steer in unison. Typically, ball joints are used as the connections between the tie rod and the steering knuckles.

A drag link receives steering input from a steering gear through a Pitman arm and transfers those steering inputs to the steered wheels in one of several ways. In some designs, the drag link is pivotally connected to the tie rod at some point between the two steering knuckle ball joints. See, for example, U.S. Pat. Nos. 4,327,926; 1,551,711; and 1,726,961. It is also known to attach the drag link directly to one of the steering knuckles using a second ball joint.

U.S. Pat. No. 2,049,502 discloses a steering linkage having a tie rod with a housing at its end containing two separate ball ends and studs, one stud projecting downward to connect with a steering arm and the other stud projecting upwardly to connect to a drag link directly on top of the tie rod.

In designing a steering linkage assembly, there are a number of performance and packaging advantages to positioning the connections between the steering knuckle and the ends of the tie rod and drag link as far outboard (with respect to the vehicle longitudinal centerline) as possible. For example, this configuration maximizes the length of the drag link to reduce bump and roll steer. It is also advantageous to locate the outboard end of the drag link as far in a longitudinal direction from the wheel steering axis as possible in order to maximize the effective steering arm radius, thereby giving improved steering authority. Positioning the outboard end of the tie rod as far from the wheel steering axis as possible provides a greater moment arm which reduces the loading on the steering linkage components. It also improves packaging and enables the tie rod to extend in a straighter line between the steering knuckles, thereby reducing buckling stresses and permitting a smaller diameter rod to be used.

In all previously known steering linkages, the connection between the steering knuckle and the ball joints for the tie rod and drag link have not been configured to permit the advantageous geometries described above to be achieved simultaneously.

SUMMARY OF INVENTION

The present invention provides a steering linkage assembly in which a tie rod and a drag link are connected to a steering knuckle in an over/under arrangement, with first and second ball joints for the drag link and the tie rod respectively on opposite sides of the steering knuckle and having a common axis that is located within an interior volume of a wheel supported by the steering knuckle. The coaxial, over/under configuration results in a ball joint assembly having a minimum axial dimension so that both ball joints can be located inside the inner rim of the wheel, and hence as far outboard and as far forward as possible. The extreme outboard placement of the drag link ball joint maximizes the length of the drag link to reduce bump and roll steer sensitivity, and the forward placement maximizes the effective steering arm radius and reduces steering linkage loads while also improving packaging.

The invention further provides a ball joint unit for use in a motor vehicle steering linkage comprising a first steering link socket, a second steering link socket, a steering knuckle for supporting a wheel and having a generally vertical through hole, and a stud passing through the through hole in the steering knuckle. The stud comprises a first ball portion disposed at a first end of the stud above the steering knuckle and received in said first socket for pivotal movement of said first link relative to said first ball portion, and a second ball portion disposed at an opposite second end of the stud below the steering knuckle and received in said second socket for pivotal movement of said second link relative to said second ball portion.

Other features and advantages of the present invention will be readily appreciated and better understood after reading the subsequent description when considered in connection with the accompanying drawings.

BRIEF DESCRIPTION OF DRAWINGS

FIG. 5 is a cross-sectional view showing a second embodiment of the invention.

FIG. 6 is a cross-sectional view showing a third embodiment of the invention.

DETAILED DESCRIPTION

Figure 1:
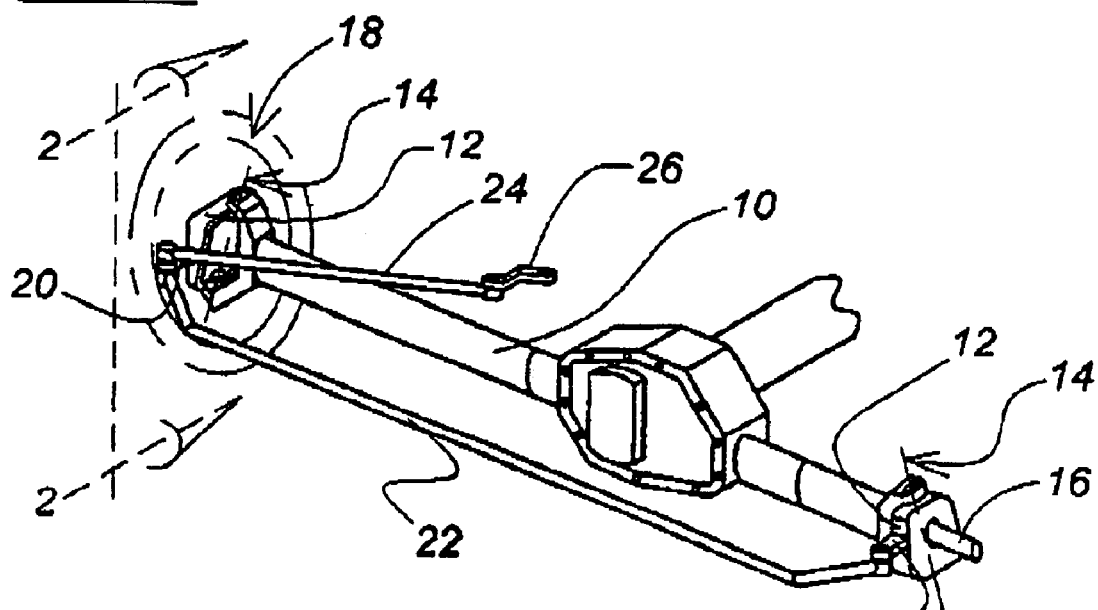
FIG. 1 is a partial perspective view of a vehicle chassis front end having a steering linkage according to the invention.

Referring to FIG. 1, a steering linkage assembly according to the present invention is shown utilized in conjunction with a drive axle 10 of an automotive vehicle, but the invention may also be practiced in relation to a non-driven axle. Steering knuckles 12 are movably attached to either end of drive axle 10 and are pivotable about respective king-pin axes 14 to steer the vehicle, as is well known in the automotive arts. Steering knuckles 12 include spindles 16 for rotatably mounting a wheel 18, shown in phantom in FIG. 1. A pneumatic tire (not shown) is typically mounted on wheel 18. Drive axle 10 is typically connected to a vehicle frame (not shown) by coil or leaf springs, shock absorbers, and/or other suspension components that are of conventional design and so are not shown.

Each steering knuckle 12 includes a forwardly projecting steering arm 20. A tie rod 22 extends between and is connected to steering arms 20 (in a manner to be described in detail below) so that steering knuckles 12 must pivot about their respective king-pin axes 14 in unison. A drag link 24 has an outboard end connected to an upper side of the right steering arm 20 adjacent the tie rod 22 connection, and an inboard end connected to a Pitman arm 26. As is well known in the art, Pitman arm 26 is actuated by a manual or powered steering gear (not shown) to move drag link 24 left and right, thereby apply steering input to the right steering knuckle that is then transferred to the left steering knuckle by tie rod 22.

Figure 4:
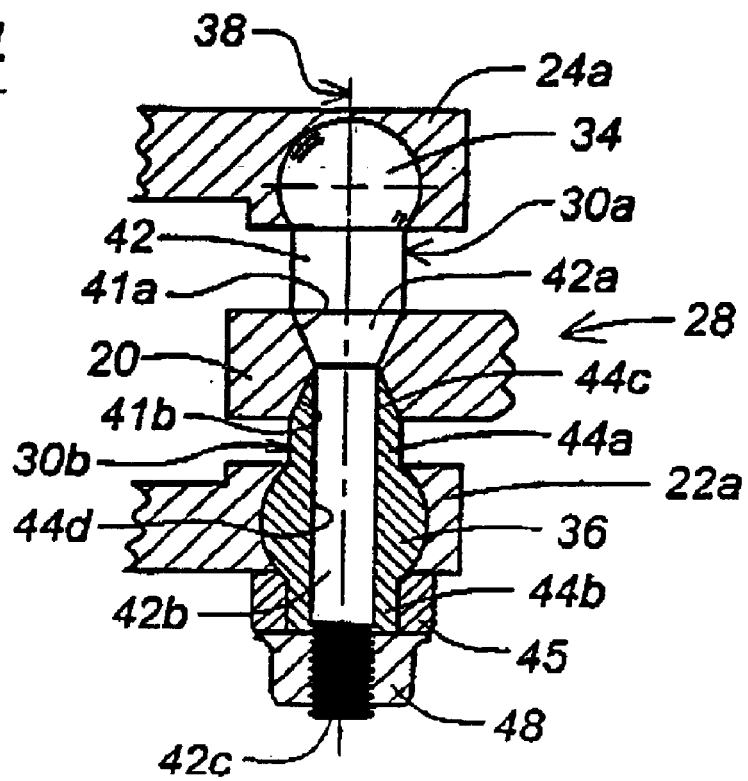
FIG. 4 is a cross-sectional view of a ball joint showing a first embodiment of the invention.

Drag link 24 and tie rod 22 are connected to steering knuckle 12 in an over/under configuration by means of a steering linkage ball joint unit 28. As best seen in FIG. 4, ball joint unit 28 comprises an upper stud part 30a and a lower stud part 30b and that extend through a hole in steering arm 20 and have first and second ball joints 34,36 disposed above and below the steering arm 20 respectively, a drag link socket 24a pivotingly engaging the first ball joint, and a tie rod socket 22a pivotingly engaging the second ball joint. The first and second ball joints 34,36 define a link attachment axis 38 that may be oriented vertically or may be inclined somewhat from vertical, depending on the desired suspension geometry.

Figure 2:
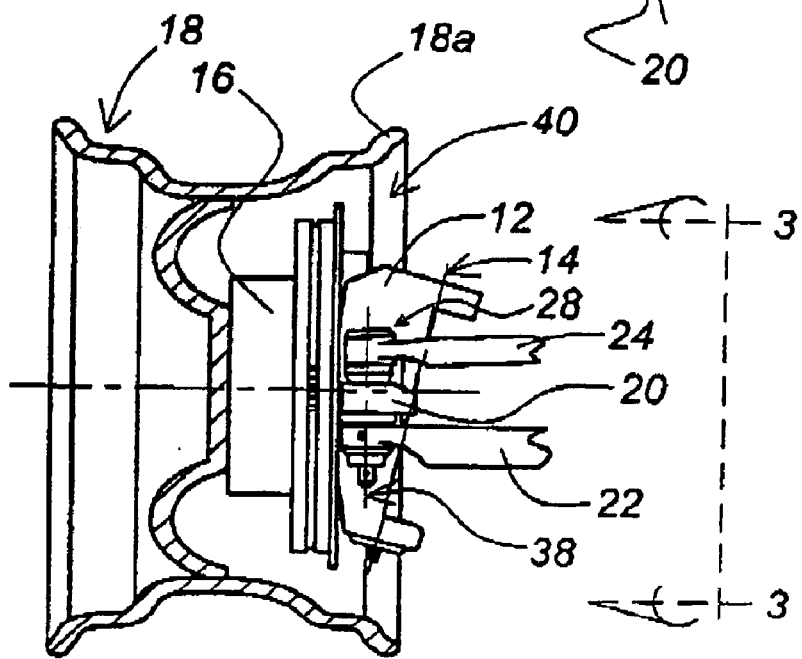
FIG. 2 is a detail elevation view taken along line 2—2 of FIG. 1.
Figure 3:
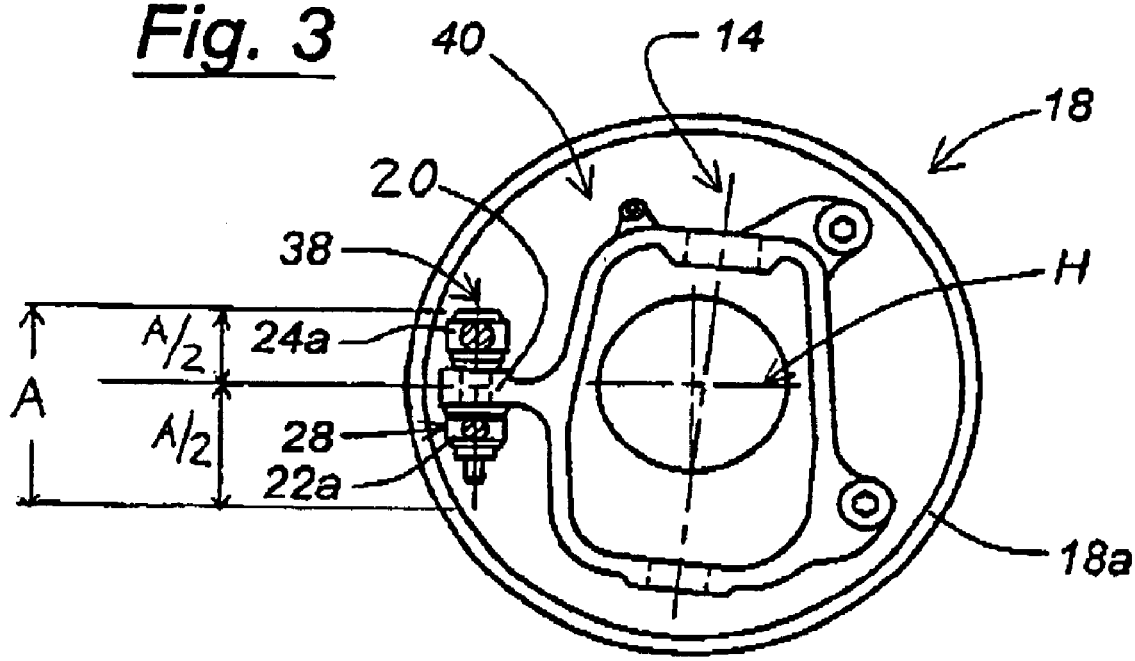
FIG. 3 is a cross-sectional view along line 3—3 of FIG. 2.

As best seen in FIGS. 2 and 3, ball joint unit 28 and link attachment axis 38 are located inside of the generally cylindrical interior wheel volume 40 defined by the wheel rim 18a. Stated another way, ball joint unit 28 and axis 38 are located outboard of a plane defined by the inboard-most edge of wheel rim 18a. This placement is made possible by the compact, over/under configuration of ball joint unit 28, and allows the ball joint unit to be positioned as far outboard (relative to a longitudinal centerline of the vehicle) as possible, and simultaneously as far forward of the wheel axis of rotation as possible.

The axial dimension A of ball joint unit 28 is preferably kept to a minimum so that the ball joint unit may be located as far forward within the wheel interior volume 40 as is possible without causing physical interference between the ball joint unit and the wheel rim 18a. Ball joint unit 28 is preferably located as far forward of the kingpin axis 14 as possible in order to maximize the effective steering arm radius, reduce steering linkage forces, and minimize bends/offsets in the linkage.

The ability to locate ball joint unit 28 as far forward as possible is also aided if the axial dimension A is distributed evenly above and below a reference line H passing through the axis of rotation of wheel 18. Assuming, for example, that the drag link socket/first ball joint combination and the tie rod/second ball joint combination have identical overall axial dimensions, the steering arm 20 would lie directly on the reference line H, as is shown in FIG. 3.

In some vehicle designs, the steering arm 20 may extend rearward from the knuckle, placing the ball joint unit rearward of the wheel's axis of rotation. In this case, the foregoing discussion of locating the ball joint unit as far forward as possible may be generalized to say that it should be as far as possible away from the wheel's axis of rotation.

In a first embodiment of the ball joint unit 28 depicted in FIG. 4, the stud comprises an upper stud part 30a and a lower stud part 30b. Upper stud part 30a comprises the first ball joint 34 and a shank 42 having a conical shank portion 42a and a cylindrical shaft 42b with a male threaded portion 42c at its tip. Lower stud part 30b comprises the second ball joint 36, a shank 44a, and a lower end portion 44b. The uppermost end of shank 44a comprises a conical shank portion 44c. An axial hole 44d passes completely through lower stud part 30b.

The steering arm 20 has a convergent/divergent through hole comprising an upper tapered surface 41a and a lower tapered surface 41b. The shank 42 of upper stud part 30a projects downwardly into the through hole in arm 20 such that conical shank portion 42a frictionally engages upper tapered surface 41a and the shaft 42b extends through the axial hole 44d in lower stud part 30b. The conical shank portion 44c of lower stud part 30b frictionally engages lower tapered surface 41b, a washer 45 fits over lower end portion 44b, and a nut 48 engages upper stud part threaded portion 42c to secure the ball joint unit 28 together. Seals (not shown) may be provided as necessary between ball joints 34,36 and arm 20 and/or other parts of the steering linkage, as is well known in the art, to keep out moisture, dirt, and other contaminants.

For proper structural support in the attachment of a ball stud to a steering knuckle, it is common engineering practice to require a minimum length of engagement ratio, L/D, where D is the diameter of the stud shank and L is the length of the stud engaged by the knuckle. Under this practice, the placement of two ball studs in coaxial alignment at the knuckle would require that the minimum engagement lengths for each of the two ball stud be added together. This effectively doubles the required engagement length, and so would result in the ball joint unit having a large axial dimension that would at least partially negate the packaging and geometry advantages that are the object of the present invention.

This problem is solved by the use of the convergent/divergent, double taper geometry of the through hole tapered surfaces 41a,41b and stud shanks 42a,44c. This inventive design allows the required engagement lengths of the upper and lower ball joint studs to effectively overlap one another, which results in a significant reduction in the axial package envelope and enables the double ball joint to package within the wheel in an optimal manner.

FIG. 5 depicts a second embodiment of a ball joint unit 128 in which upper stud part shank 142 has a conical shank portion 142a and a cylindrical shaft 142b with a female threaded hole 142c formed in its lower end. Lower stud part shank 144 comprises a conical shank portion 144a and an axial hole 144b extends therethrough. Upper stud part shank 142 extends through the through hole in the steering knuckle 20 and into the axial hole 144b. A male threaded fastener 146 is inserted into the axial hole 144b from the bottom end and engages the female threaded hole 142c in shank 142 to secure the first and second stud parts to one another. The lower end of the axial hole 144b may be of an enlarged diameter to provide clearance for the head of male fastener 146.

In a third embodiment of the invention shown in FIG. 6, the upper stud part 230a comprises a shank 242 having a conical shank portion 242a and a male threaded portion 242b. Lower stud part 230b comprises a shank 244 having a conical shank portion 244a and a female threaded hole 244b. The upper stud part 230a projects downwardly into the through hole in arm 20 such that conical shank portion 242a frictionally engages upper tapered surface 41a, and the lower stud part 230b projects upwardly into the through hole such that conical shank portion 244a frictionally engages lower tapered surface 41b. Male threaded portion 242b engages female threaded hole 244b to secure the upper and lower stud parts together.

Other arrangements for securing the first and second ball joints to the steering arm in the over/under arrangement will be apparent to a person of skill in the art.

While the best modes for carrying out the invention have been described in detail, those familiar with the art to which this invention relates will recognize various alternative designs and embodiments for practicing the invention as defined by the appended claims.

What is claimed is:

1. Apparatus for use in a motor vehicle, comprising:

a first steering link having a first socket at an end thereof;

a second steering link having a second socket at an end thereof;

a steering knuckle having a spindle for supporting a wheel for rotation and a steering arm having a through hole, the through hole comprising a first tapered portion oriented toward a first side of the steering arm and a second tapered portion oriented toward a second side of the steering arm; and a stud passing through the through hole in the steering arm and defining a link attachment axis, the stud comprising a first stud portion and a second stud portion, the first stud portion comprising a first ball portion disposed adjacent the first side of the steering arm and received in said first socket for pivotal movement of said first link relative to said first ball portion and a first shank portion extending front the first ball portion, the first shank portion having a conical portion engaging the first tapered portion of the through hole, end the second stud portion comprising a second ball portion disposed adjacent the second side of the steering arm and received in said second socket for pivotal movement of said second link relative to said second ball portion and a second shank portion extending from the second bail portion, the second shank portion having a conical portion engaging the second tapered portion of the through hole.

2. Apparatus according to claim 1 wherein the steering arm extends forwardly from the wheel.

3. Apparatus according to claim 1 wherein the steering knuckle is attached to a drive axle.

4. Apparatus according to claim 1 wherein the first steering link is a drag link, and the second steering link is a tie rod.

5. The apparatus according to claim 1 wherein:

said second stud portion has a through opening extending axially through said second stud portion; and said first shank portion extends through said through hole in said steering arm and through said through opening in said second stud portion.

6. The apparatus according to claim 1 wherein:

said first shank portion has a male threaded end distal from the first ball portion;

said second stud portion has a female threaded hole; and said first shank portion extends through said through hole in said steering arm and said male threaded end engages said female threaded hole in said second stud portion to secure said first stud portion to said second stud portion.

7. The apparatus according to claim 1 wherein:

said first shank portion has a female threaded hole in an end distal from the first ball portion;

said second stud portion has a through opening extending axially through said second stud portion; and said first shank portion oextends through said through hole in said steering arm and into said through opening in said second stud portion from a first end thereof, a male threaded fastener being inserted into said through opening from a second end thereof and threadingly engaging said female threaded hole in said first shank portion to secure said first stud portion to said second stud portion.

8. A ball joint unit for use in a motor vehicle steering linkage, comprising:

a steering knuckle for supporting a wheel and having a generally vertical through hole, the through hole comprising a first tapered surface oriented toward a first side of the knuckle and a second tapered surface oriented toward a second side of the knuckle;

a first stud part having a first ball portion and a first shank portion extending therefrom into the through hole, the first shank portion having a conical shank portion that engages the first tapered surface, and;

a second stud part having a second ball portion and a second shank portion extending from the second ball portion and into the through hole, the second shank portion having conical shank portion that engages the second tapered surface.

9. The ball joint unit according to claim 8 wherein:

said second stud part has a through opening extending axially therethrough; and said first shank portion extends through said through hole in said steering knuckle and through said through opening in said second stud part.

10. The ball joint unit according to claim 8 wherein:

said first shank portion has a male threaded end distal from the first ball portion;

said second stud part has a female threaded hole; and said first shank portion extends through said through hole in said steering knuckle and said male threaded end engages said female threaded hole in said second stud part to secure said first stud part to said second stud part.

11. The ball joint unit according to claim 8 wherein:

said first shank portion has a female threaded hole in an end distal from the first ball portion;

said second stud part has a through opening extending axially through said second stud part; and said first shank portion extends through said through hole in said steering knuckle and into said through opening in said second stud part from a first end thereof, a male threaded fastener being inserted into said through opening from a second end thereof and threadingly engaging said female threaded hole in said shank portion of said first stud part to secure said first stud part to said second stud part.

* * * * *